(12) United States Patent
Wong et al.

(10) Patent No.: US 11,920,728 B1
(45) Date of Patent: Mar. 5, 2024

(54) ACCESSORY MOUNTING SYSTEM

(71) Applicant: MillerKnoll, Inc., Zeeland, MI (US)

(72) Inventors: Eric Wong, Saratoga, CA (US); Ralph Farrer, Somerset (GB); Pei Jian Zhang, Dongguan (CN)

(73) Assignee: MILLERKNOLL, INC., Zeeland, MI (US)

( * ) Notice: Subject to any disclaimer, the term of this patent is extended or adjusted under 35 U.S.C. 154(b) by 0 days.

(21) Appl. No.: 18/087,022

(22) Filed: Dec. 22, 2022

(51) Int. Cl.
*F16M 13/02* (2006.01)
*A47G 29/08* (2006.01)

(52) U.S. Cl.
CPC ......... *F16M 13/022* (2013.01); *A47G 29/083* (2013.01)

(58) Field of Classification Search
CPC .......................... F16M 13/022; A47G 29/083
USPC ...................................................... 248/219.4
See application file for complete search history.

(56) References Cited

U.S. PATENT DOCUMENTS

| | | | |
|---|---|---|---|
| 5,513,825 A | 5/1996 | Gutgsell | |
| 5,829,366 A | 11/1998 | Uono | |
| 8,011,308 B2 | 9/2011 | Picchio | |
| 8,104,828 B2 | 1/2012 | Knighton | |
| 8,960,104 B2 * | 2/2015 | Copeland | A47B 9/00 108/5 |
| 9,720,444 B2 * | 8/2017 | Holden | A47B 13/081 |
| 9,859,748 B2 * | 1/2018 | Wang | H01L 31/042 |
| 9,913,532 B1 * | 3/2018 | Jones | A47B 9/02 |
| 10,420,417 B1 | 9/2019 | Jones et al. | |
| 10,514,126 B2 | 12/2019 | Asante | |
| 10,555,859 B2 | 2/2020 | Davis et al. | |
| 10,595,629 B2 | 3/2020 | Ko | |
| 10,631,631 B1 | 4/2020 | Pei | |
| 10,654,315 B1 | 5/2020 | Kamrowski et al. | |
| 10,702,058 B1 | 7/2020 | Wang | |
| 11,406,179 B2 * | 8/2022 | Grabowski | A47B 9/20 |
| 11,534,116 B1 * | 12/2022 | Canon | A61B 6/0407 |
| 2004/0051013 A1 | 3/2004 | Risdall | |

(Continued)

FOREIGN PATENT DOCUMENTS

| | | |
|---|---|---|
| CN | 201238750 Y | 5/2009 |
| CN | 209421290 U | 9/2019 |
| CN | 215014475 U | 12/2021 |

(Continued)

*Primary Examiner* — Todd M Epps
(74) *Attorney, Agent, or Firm* — MICHAEL BEST & FRIEDRICH LLP

(57) ABSTRACT

An accessory mounting system configured to be supported by a furniture item, the accessory mounting system comprises a sleeve and a support member. The sleeve includes a body that is movable between a closed position and an open position. The body has a periphery partially surrounding a longitudinal axis and terminating at radial ends. The body has a pair of first features each positioned adjacent one of the radial ends. The support member includes a support portion and a sleeve engaging portion having a pair of second features configured to engage the pair of first features. In the closed position, a gap having a first size is formed between the pair of first features, and the pair of second features engages the pair of first features to hold the body in the closed position. In the open position, the gap has a second size larger than the first size.

20 Claims, 8 Drawing Sheets

(56) References Cited

U.S. PATENT DOCUMENTS

2021/0378400 A1 12/2021 Egger

FOREIGN PATENT DOCUMENTS

| | | |
|---|---|---|
| CN | 215501760 U | 1/2022 |
| CN | 215636230 U | 1/2022 |
| CN | 110801102 B | 7/2022 |
| CN | 217851808 U | 11/2022 |
| EP | 1563761 A1 | 8/2005 |
| EP | 1437066 B1 | 7/2006 |
| EP | 1374725 B1 | 11/2008 |
| EP | 1849376 B1 | 4/2015 |
| EP | 3451871 B1 | 9/2021 |

* cited by examiner

ACCESSORY MOUNTING SYSTEM

FIELD OF THE INVENTION

The present invention relates to accessory mounting systems and, more particularly, accessory mounting systems for furniture items.

SUMMARY OF THE INVENTION

In one embodiment, an accessory mounting system configured to be supported by a furniture item. The accessory mounting system comprises a sleeve and a support member. The sleeve includes a body, a periphery, and a pair of first features. The body is at least partially elastically deformable and movable between a closed position and an open position. The periphery partially surrounds a longitudinal axis and terminates at radial ends. Each first feature is positioned adjacent one of the radial ends. The support member includes a support portion configured to support an object and a sleeve engaging portion having a pair of second features configured to engage the pair of first features. In the closed position, a gap having a first size is formed between the pair of first features, and the pair of second features engages the pair of first features to hold the body in the closed position. In the open position, the gap between the pair of first features has a second size that is larger than the first size.

In a further embodiment, an accessory mounting system configured to be supported by a furniture item having an abutment surface, the accessory mounting system comprising a sleeve and a support member. The sleeve includes a body which is at least partially elastically deformable and movable between a closed position and an open position. The body has a periphery partially surrounding a longitudinal axis, the periphery having an axial end, and terminating at radial ends. The sleeve further includes a lip extending radially inwardly from the periphery towards the longitudinal axis to engage the abutment surface. The support member includes a support portion configured to support an object and a sleeve engaging portion coupled to the sleeve.

In a further embodiment, a method of securing an accessory mounting system to a furniture item, the accessory mounting system including a sleeve having a body with a periphery terminating at radial ends and a pair of first features positioned adjacent the radial ends, the accessory mounting system also including a support member having a support portion configured to support and object and a sleeve engaging portion having a pair of second features. The method comprises positioning the sleeve around a portion of the furniture item, moving the first features toward each other while the sleeve is positioned around the furniture item, and sliding the support member onto the sleeve while the pair of first features are moved together such that the pair of second features engages the pair of first features to secure the accessory mounting system to the furniture item.

Other aspects of the invention will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
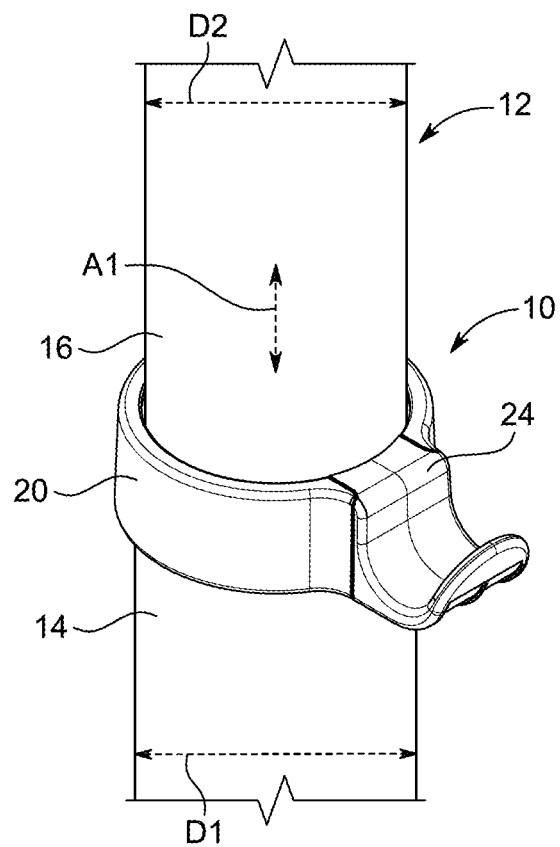
FIG. 1 is a perspective view of an accessory mounting system on a portion of a furniture item.

FIG. 1 illustrates an accessory mounting system 10 secured to a furniture item 12. The accessory mounting system 10 may or support or hold accessories (e.g., bags, headphones, jackets, purses, cases, cords, voice activated assistants, etc.) on the furniture item 12. The accessory mounting system 10 is shaped to fit over the furniture item 12 such that the accessory mounting system 10 is configured to transfer the weight of the accessory or accessories coupled from the accessory mounting system 10 to the furniture item 12. The accessory mounting system 10 includes a sleeve 20 and a support member 24 (e.g., a hook member). The sleeve 20 is elastically deformable and may be coupled to the furniture item 12 by expanding beyond the dimensions of the furniture item 12, and contracting to conform to the dimensions of the furniture item 12. Additionally or alternatively, the sleeve 20 may be translated along the furniture item 12 to a position where the sleeve 20 is supported by the furniture item 12. In some embodiments, the support member 24 may be generally rigid. The support member 24 is configured to retain the sleeve 20 in its contracted (i.e., locked) position relative to the furniture item 12, and also to hold or support the accessory (or accessories).

Figure 13:
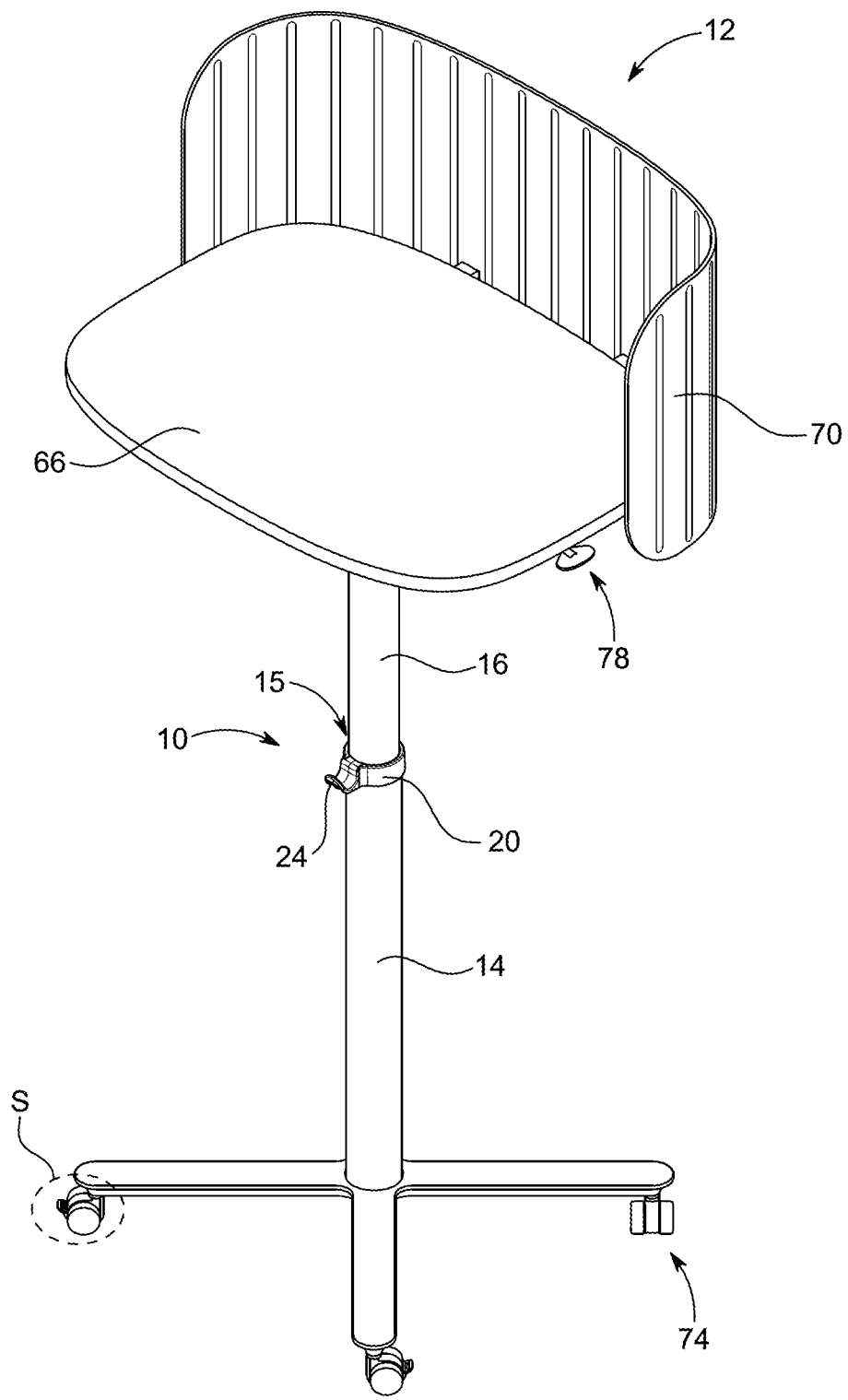
FIG. 13 is a perspective view of the accessory mounting system and furniture item of FIG. 1.

In the illustrated embodiment, the furniture item 12 is a post or leg of a height adjustable standing workstation 12 (FIG. 13). The illustrated post or leg has a circular cross-sectional shape. The furniture item may have any other cross-sectional shape, such as a square, rectangular, rounded, hexagonal, oblong, irregular, and any other cross-sectional shape. However, the furniture item 12 may be any part of a fixed-size furniture item 12. For example, the accessory mounting system 10 may be positioned on (i.e., configured for use with, supported by) other types of furniture items 12 or parts of furniture items 12, such as a desk leg or support, a couch or chair leg, a bedpost, a lamppost, a shelving unit, a wall bracket or shelf, or any other suitable structure having a relatively narrow section.

The illustrated furniture item 12 is a telescopic height adjustable standing workstation 12 including an outer post 14 and an inner post 16. Other furniture items 12 may not be adjustable. The outer post 14 and the inner post 16 are movable (e.g., telescopically movable) relative to one another along an axis A1 (e.g., a longitudinal axis). An axial end of the outer post 14 defines an abutment surface 15. The abutment surface 15, or shoulder, extends perpendicularly away from the axis A1. The outer post 14 has an outer dimension D1 (i.e., an outer post dimension). The inner post 16 has an outer dimension D2 (i.e., an inner post dimension) which is smaller than the outer dimension D1. In the illustrated embodiment, the outer post 14 and the inner post 16 are annularly shaped, and the outer dimensions D1, D2 each relate to outer diameters. However, with otherwise shaped posts 14, 16, the outer dimensions D1, D2 may represent a largest cross-sectional dimension of the respective posts 14, 16.

Figure 2:
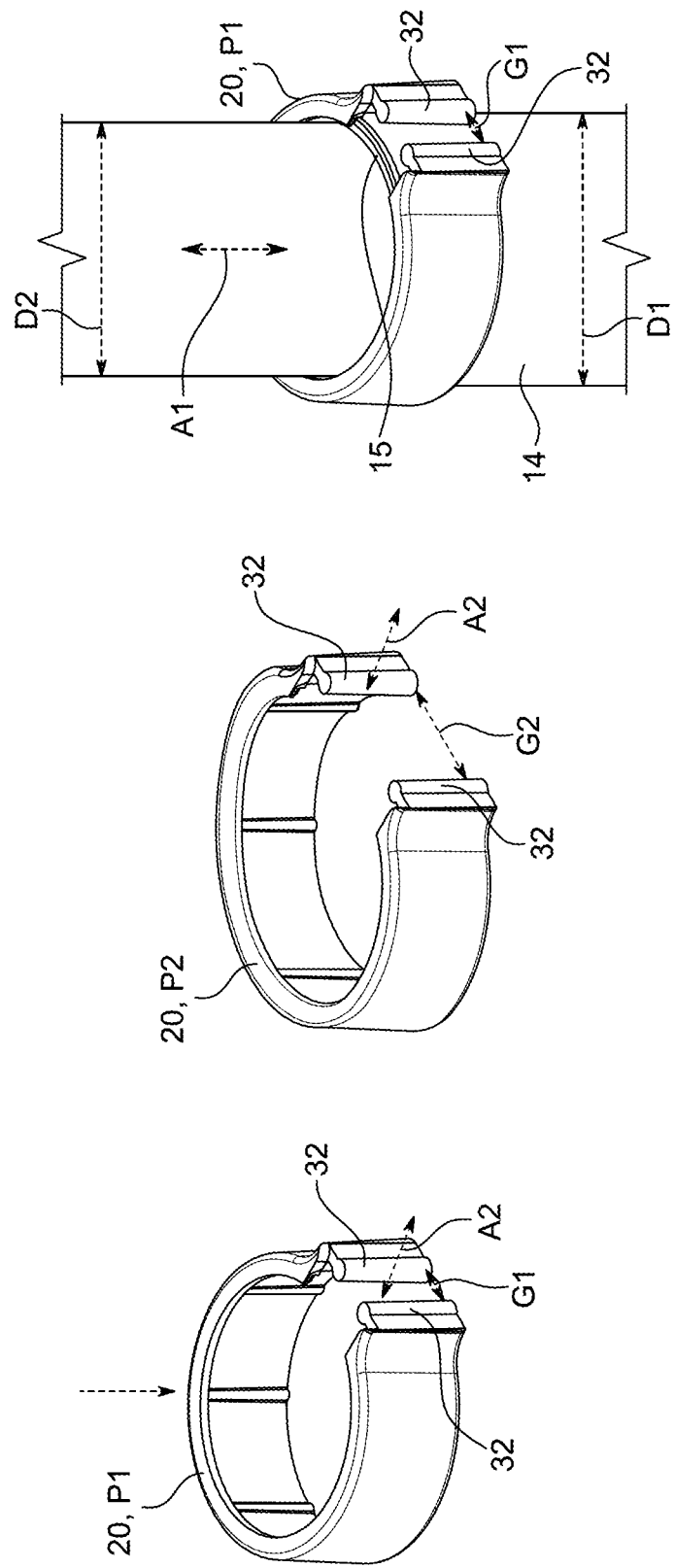
FIG. 2 is a perspective view of a sleeve of the accessory mounting system of FIG. 1 being attached to the furniture item.
Figure 3:
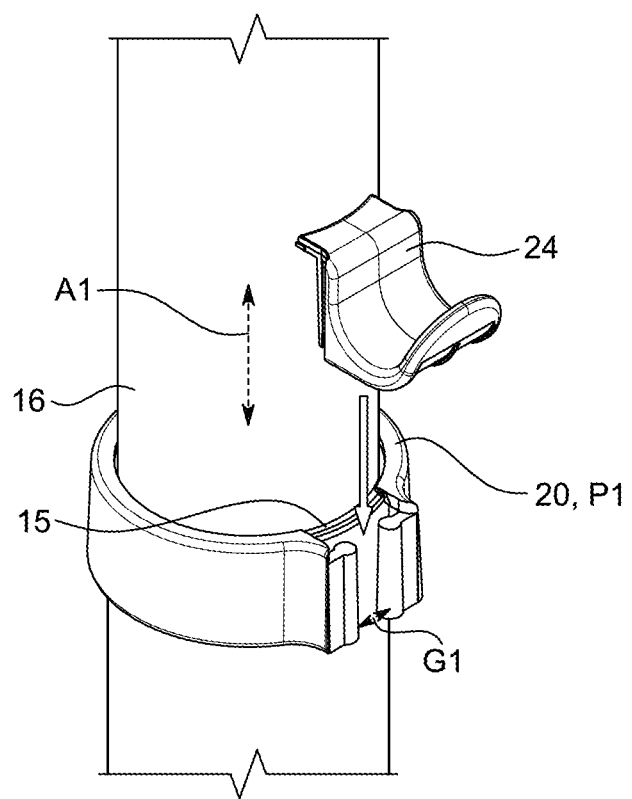
FIG. 3 is a perspective view of a support member being attached to the sleeve of the accessory mounting system of FIG. 1.

As shown in FIGS. 1-3, the accessory mounting system 10 is removably coupled to the furniture item 12. In the illustrated embodiment, the accessory mounting system 10 and furniture item 12 are each dimensioned with a similar cross-sectional shape (e.g., both the accessory mounting system 10 and furniture item 12 are generally circular in cross-section). However, it is possible that the accessory mounting system 10 and furniture item 12 may be differently shaped (e.g., the furniture item 12 may be generally octagonal, and the accessory mounting system 10 may be generally square). The illustrated sleeve 20 is generally C-shaped. As illustrated in FIG. 2, when removed from the furniture item 12 (which extends along the axis A1), the sleeve 20 is in a relaxed (i.e., closed) position P1. In some instances, during coupling of the sleeve 20 with the furniture item 12, the sleeve 20 is expanded to an expanded (i.e., open) position P2. The sleeve 20 is biased to the relaxed position P1. To counteract biasing force of the sleeve 20, a user must apply input force to move (e.g., rotate) the sleeve 20 from the relaxed position P1 to the expanded position P2. During coupling of the sleeve 20 with the furniture item 12, in some instances, the sleeve 20 may be moved along an axis A2 which is transverse to the axis A1 defined by the furniture item 12. Once in position surrounding the furniture item 12, the input force on the sleeve 20 may be released, and the sleeve 20 may retract at least partially towards the relaxed position P1. At this point, the sleeve 20 may be supported by the abutment surface 15, or require further translation of the sleeve 20 along the axis A1 to be supported by the abutment surface 15. Once in the position illustrated in FIG. 3, the sleeve 20 is supported upon the abutment surface 15.

Figure 4:
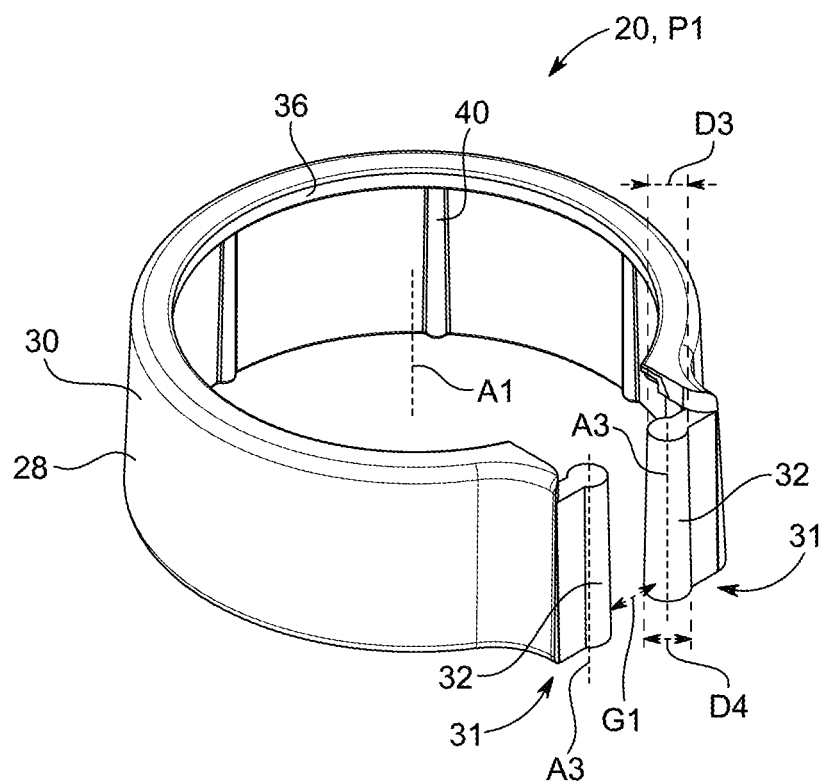
FIG. 4 is a top perspective view of the sleeve of FIG. 2.
Figure 5:
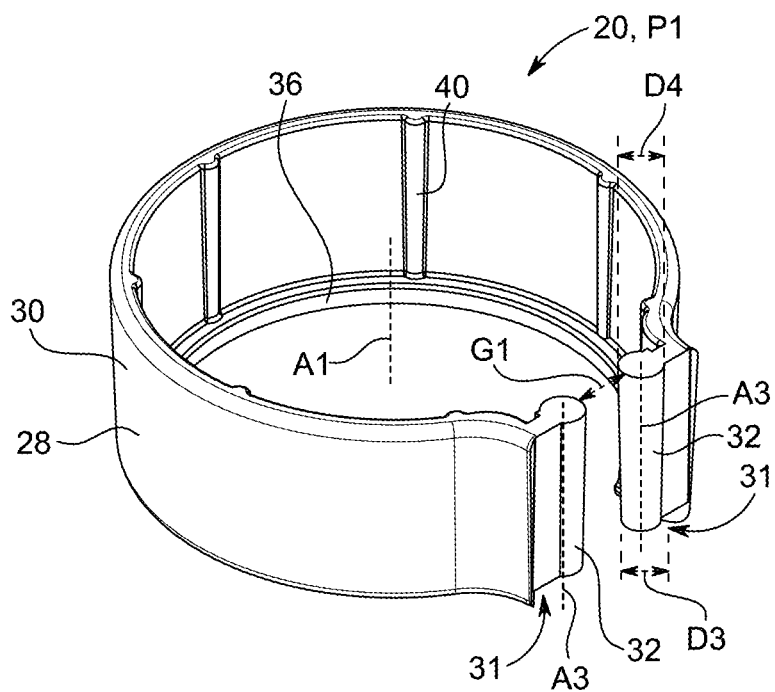
FIG. 5 is a bottom perspective view of the sleeve of FIG. 2.
Figure 9:
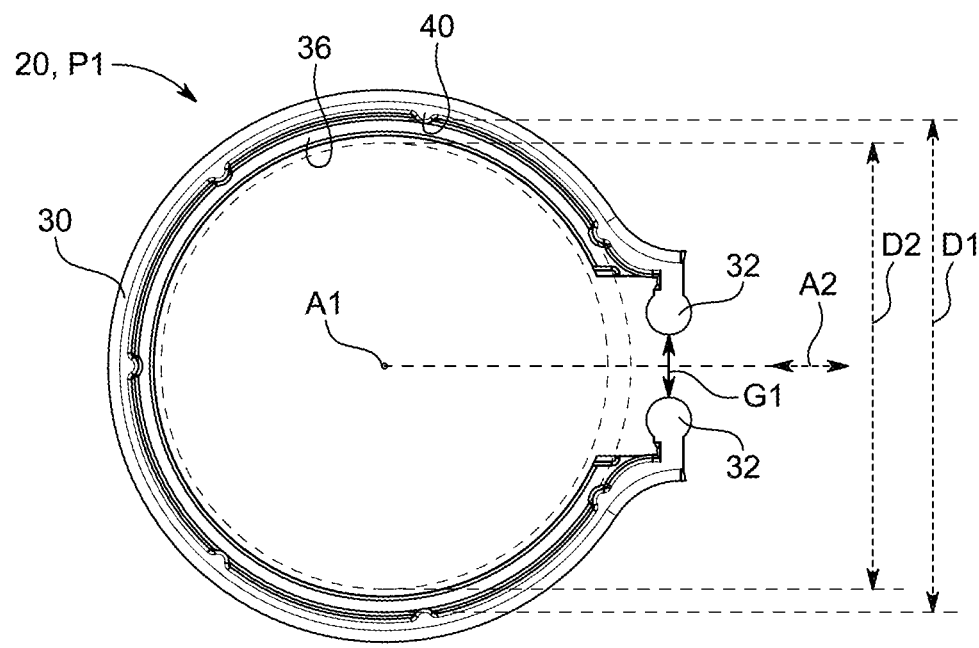
FIG. 9 is a bottom view of the sleeve of FIG. 2 in a closed position.

FIGS. 4 and 5 illustrate the sleeve 20 in detail. The sleeve 20 includes a generally C-shaped body 28 which defines a periphery 30 and terminates at two ends 31. In the illustrated embodiment, the entirety of the body 28 is elastically deformable to move the sleeve 20 between its open and closed positions. In other embodiments, portions of the body 28 may be deformable. In the illustrated embodiment, the body 28 may be made of an elastically deformable rubber or plastic material. However, other materials for the body 28 are possible. The periphery 30 at least partially surrounds the axis A1. The shape of the periphery 30 corresponds with a shape of the furniture item 12. Features (i.e., first features) 32 extend from each of the ends 31 of the sleeve 20 towards one another. In the illustrated embodiment, the sleeve 20 includes a pair of first features 32 each shaped as fingers which each project from one of the ends 31 towards the other end 31. A gap G1 spans the first features 32 when the sleeve 20 is in the closed position (FIGS. 5, 9). The sleeve 20 further includes a lip 36 at one axial end thereof. The lip 36 extends inwardly towards the axis A1 from the body 28. The illustrated lip 36 is continuous between the ends 31 of the sleeve 20. In other embodiments, the lip 36 may only extend along a portion of the circumference of the sleeve 20 and/or may be discontinuous. The lip 36 is dimensioned to rest upon the abutment surface 15. In other words, the lip 36 has a smaller inner diameter when compared to the remainder of the periphery 30. The sleeve 20 further includes ribs 40 which extend inwardly towards the axis A1 from the body 28. The ribs extend in a direction parallel to the axis A1 and inwardly from the periphery 30 towards the axis A1. When the sleeve 10 is attached to the furniture item 12, the ribs 40 engage an outer surface of the outer post 14 and may enhance the grip between the sleeve 20 and the outer post 14.

Figure 6:
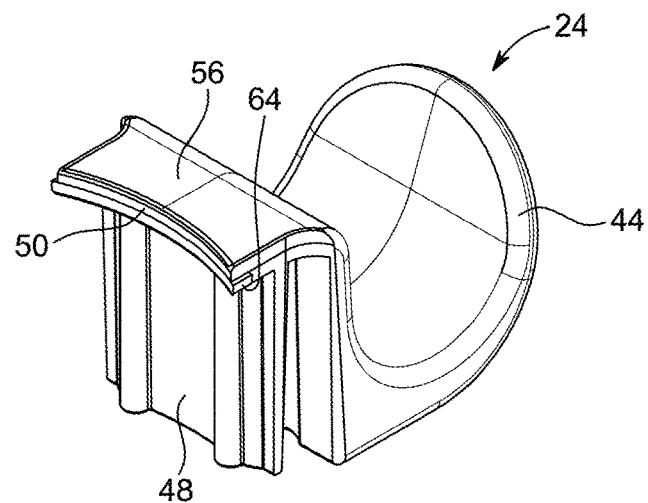
FIG. 6 is a top perspective view of the support member of FIG. 3.
Figure 7:
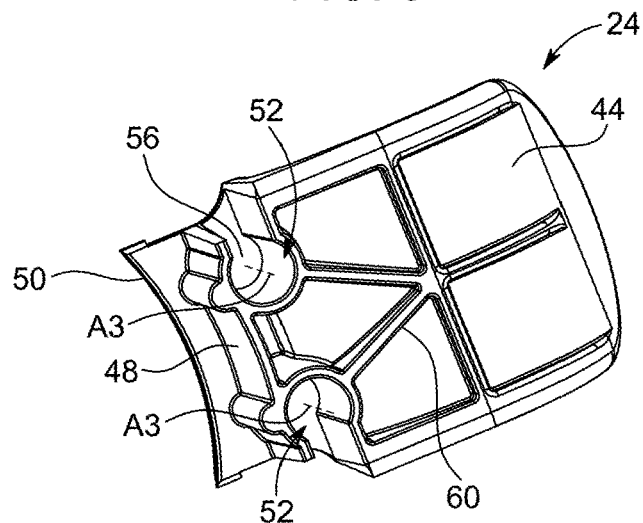
FIG. 7 is a bottom perspective view of the support member of FIG. 3.
Figure 8:
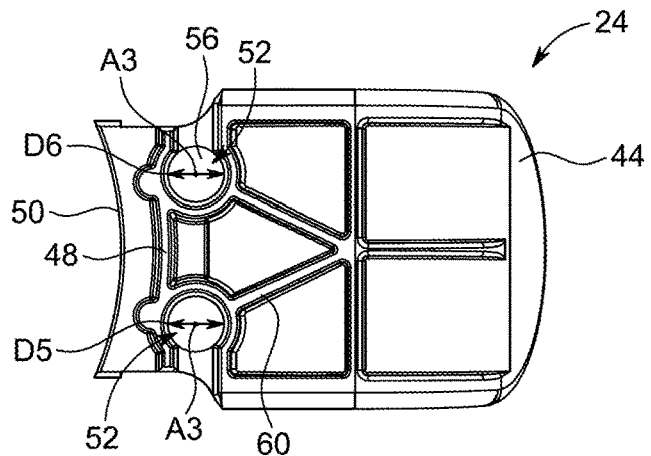
FIG. 8 is a bottom view of the support member of FIG. 3.

FIGS. 6-8 illustrate the support member 24 in detail. The support member 24 includes a support portion 44 (e.g., a hook portion), a sleeve engaging portion 48, and a connecting portion 56 which connects the support portion 44 to the sleeve engaging portion 48. The support portion 44 is configured to support the accessory (or accessories). In the illustrated embodiment, the support portion 44 includes a hook. In other embodiments, the support portion 44 may have other suitable configurations, such as a post, a shelf or platform, a mounting bracket, and the like. The sleeve engaging portion 48 is configured to engage the sleeve 20. More specifically, the sleeve engaging portion 48 includes a pair of second features 52 configured to engage the pair of first features 32. In the illustrated embodiment, the second features 52 are receptacles configured to receive the first features 32, which are fingers. However, in other embodiments, the second features 52 may be fingers, and the first features 32 may be receptacles. Alternatively, one second feature 52 may be a finger and one second feature 52 may be a receptacle, while one first feature 32 may be a finger and one first feature 32 may be a receptacle. When the support member 24 is coupled to the sleeve 20, the second features 52 are coupled to the first features 32, and one axial end of the first features 32 is supported by the connecting portion 56. The sleeve engaging portion 48 has an inner surface 50 which has a shape that corresponds with a shape of the furniture item 12. In the illustrated embodiment, the furniture item 12 is generally circular in shape, and the inner surface 50 is concave in shape to match the circular shape of the furniture item 12. Accordingly, the inner surface 50 is configured to abut the abutment surface 15 to transmit weight from the accessory (not shown) to the furniture item 12 through the support member 24. The support member 24 further includes structural support ribs 60 which enhance the rigidity of the support member 24 to support heavy loads. Generally speaking, the first features 32 and second features 52 may either have the same shape or have differing shapes that correspond with one another for engagement (e.g., an octagonal shape may engage a square shape). In some embodiments, the support member 24 may further include a clip 64 (FIG. 6). The clip 64 may be integral with or coupled to the sleeve engaging portion 48. The clip 64 projects from the sleeve engaging portion 48 and is shaped similarly to the inner surface 50 such that when the support member 24 is coupled to the sleeve the clip 64 inhibits dislodgement of the support member 24 from the sleeve 20. In some embodiments, the clip 64 may emit tactile and/or audible feedback (e.g., a "click") to the user to indicate that the support member 24 is coupled with or decoupled from the sleeve 20. Once the support member 24 is secured to the sleeve 20, the clip 64 provides a resisting force to inhibit dislodgement of the support member 24 from the sleeve 20 in instances where a removal force is applied to the support member 24. In the illustrated embodiment, the removal force may be applied in an upward direction as viewed in FIG. 6, and the resisting force may oppose the removal force, and extend in a downward direction as viewed in FIG. 6.

As best illustrated in FIGS. 4 and 8, the first features 32 and the second features 52 may each be tapered (e.g., angled) to promote secure engagement between the sleeve 20 and the support member 24. As illustrated in FIG. 4, the first features 32 have a non-constant cross-sectional size along a direction defined by a connection axis A3 which extends parallel to the longitudinal axis A1. The cross-sectional size of the first features 32 is measured perpendicular to the longitudinal axis A1. The cross-sectional size of at least one first feature 32 at an axial end closest to the lip 36 (e.g., an upper axial end) is illustrated by dimension D3, and the opposite axial end (e.g., a lower axial end) of the first feature 32 is illustrated by dimension D4. The dimension D3 is smaller than D4. In the illustrated embodiment, the first feature 32 is generally frustoconical in shape, with D3 and D4 representing diameters of the first feature 32 at axial ends thereof. While the first features 32 are non-constant in cross-sectional size, the first features 32 may remain generally cylindrical in shape. In other embodiments, the first features 32 may not be tapered (e.g., the first features 32 may be straight), and the first features 32 may be entirely cylindrical in shape. The cross-sectional size of at least one receptacle 52 at an axial end closest to the connecting portion 56 is illustrated by dimension D6 (FIG. 8), and the opposite axial end of the receptacle 52 is illustrated by dimension D5. The dimension D6 is smaller than the dimension D5. In the illustrated embodiment, the receptacle 52 is frustoconical in shape, with D5 and D6 representing diameters of the receptacle 52 at axial ends thereof. While the second features 52 are non-constant in cross-sectional size, the second features 52 remain generally cylindrical in shape. In other embodiments, the second features 52 may not be tapered (e.g., the second features 52 may be straight), and the second features 52 may be entirely cylindrical in shape. The above-described shaped first features 32 and second features 52 promote interaction and coupling between the sleeve 20 and the support members 24. In other words, at least one of the pair of first features 32 or at least one of the pair of second features 52 may be tapered to promote interconnection between the first feature 32 and the second feature 52.

Figure 10:
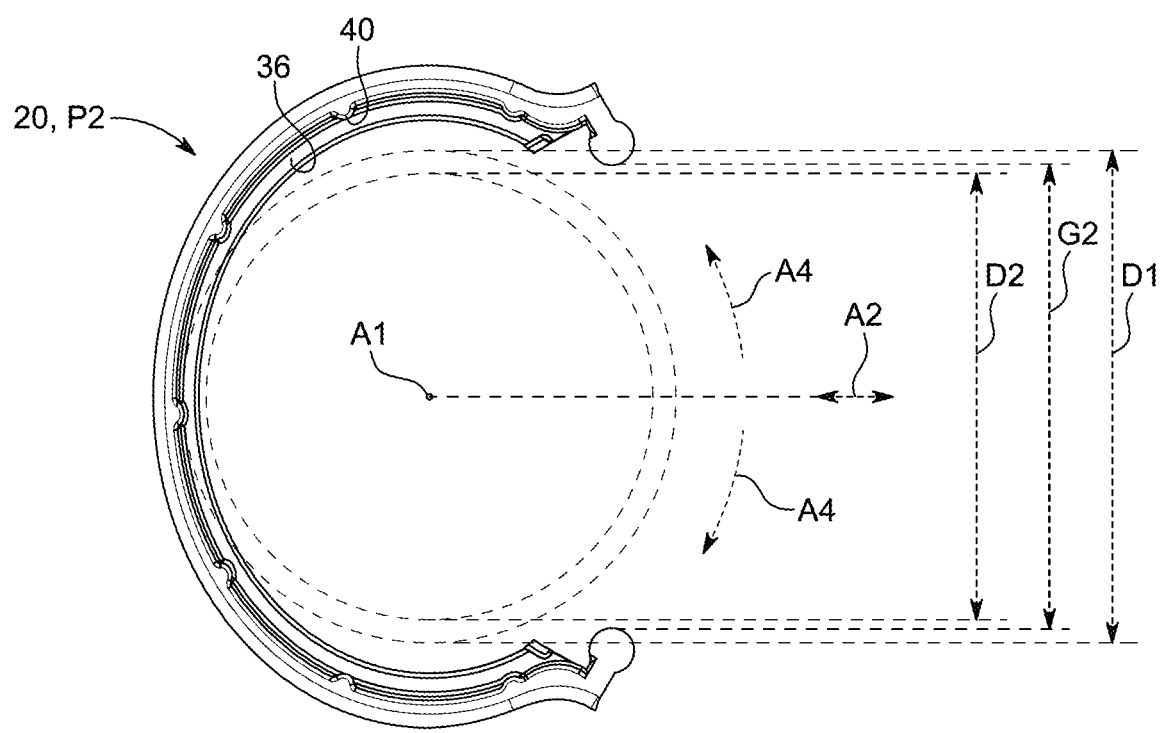
FIG. 10 is a bottom view of the sleeve of FIG. 2 in an open position.

FIGS. 9 and 10 represent end views of the sleeve 20 in closed and open positions, respectively, and relative to the lip 36. As shown in FIG. 9, the gap G1 between the first features 32 is smaller in size than both the dimension D1 and the dimension D2, and the first features 32 are each positioned relatively close to the axis A2. In this position, the lip 36 extends towards the axis A1 to take up space between the dimension D1 and the dimension D2. Accordingly, when the sleeve 20 is relaxed, the lip 36 is configured to rest upon the abutment surface 15. In transitioning to the open position of FIG. 10, the sleeve 20 is moved (e.g., rotated) away from the axis A2 as represented by the arrows A4. In the open position (FIG. 10), the first features 32 are spaced further away from one another when compared to the closed position. In other words, the gap G1 expands to a gap G2 in the open position. The gap G2 is larger in size than the gap G1. The gap G2 is also at least as large as the dimension D2 such that the sleeve 20 can be wrapped around the furniture item 12. In the closed position, the gap G1 is dimensioned to align the first features 32 with the second features 52 and such that the sleeve engaging portion 48 of the support member 24 can secure the sleeve 20 on the furniture item 12. In the open position (FIG. the gap G2 may be as large or larger than the dimension D1. The gaps G1, G2 each extend in a direction perpendicular to and spaced from the axis A1. The gaps G1, G2 also each extend perpendicular from the axis A2. The size of the gap G1 is greater than zero such that in the closed position (FIG. 9), the first features 32 are spaced from one another in a direction perpendicular to and spaced from the longitudinal axis. When moved to the open position, the sleeve 20 may be moved to at least partially surround the furniture item 12.

Figure 11:
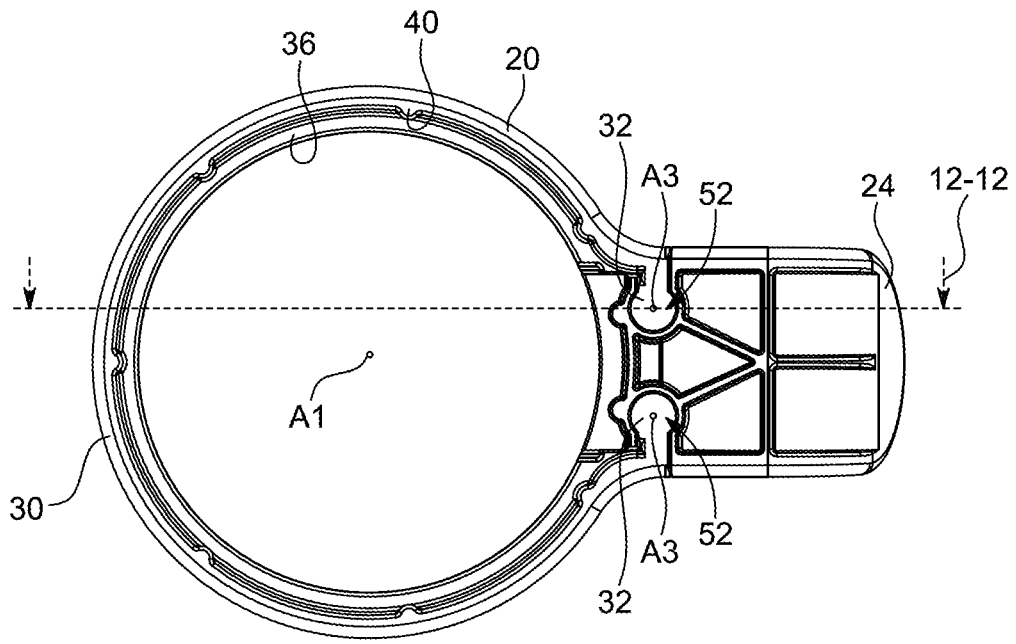
FIG. 11 is a bottom view of the accessory mounting system of FIG. 1.
Figure 12:
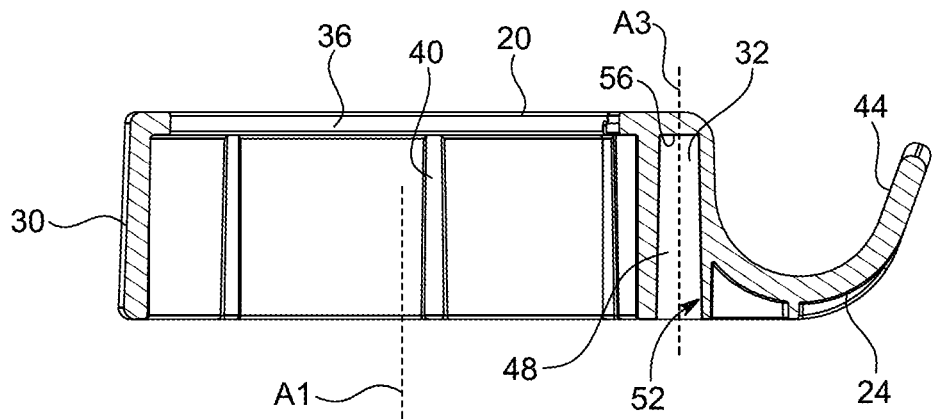
FIG. 12 is a cross-sectional view of the accessory mounting system taken along section line 12-12 in FIG. 11.

FIGS. 11 and 12 each illustrate the accessory mounting system 10 with the sleeve and the support member 24 coupled to one another. As shown in FIG. 11, when coupled to one another, the first features 32 of the sleeve 20 are aligned with the second features 52 of the support member 24 about common connection axes A3. In the illustrated embodiment, the connection axes A3 extend in a direction parallel to the axis A1. However, the connection axes A3 may not be parallel with the axis A1. The first features 32 and the second features 52 have cross-sectional shapes that are compatible with one another. In the closed position, the pair of second features 52 are configured to engage the pair of first features 32 to hold the sleeve 20 (and the body 28 thereof) in the closed position.

The accessory mounting system 10 may be coupled to the furniture item 12 and supported by the abutment surface 15 in various ways. The sleeve 20 is positioned relative to the furniture item 12 with the lip 36 in abutment with the abutment surface 15. The abutment surface 15 provides support for the sleeve 20. The support member 24 is coupled with the sleeve by coupling the pair of first features 32 with the pair of second features 52. This inhibits opening of the sleeve 20 and removal of the sleeve 20 from the furniture item 12. As the sleeve is inhibited from opening, so long as the sleeve 20 is not lifted form the abutment surface 15, the sleeve 20 will be supported by the furniture item 12. Once coupled to the sleeve 20 with the lip 36 in abutment with the abutment surface 15, the support member 24 is configured to support an accessory or a number of accessories (e.g., bags, headphones, jackets, purses, cases, cords, voice activated assistants, etc., not shown) on the furniture item 12. Weight of the accessory or accessories will be transferred through the support member 24 and the sleeve 20 to the abutment surface 15, and the furniture item 12 will support the accessory. In other embodiments, the sleeve 20 may be tightened onto the furniture item 12 such that friction between the sleeve 20 and the furniture item 12 supports the weight of the accessory. In some instances, the sleeve 20 may be moved (i.e., translated) along the furniture item 12 toward the abutment surface 15. In some instances (e.g., moving the sleeve 20 in a direction from the outer post 14 towards the inner post 16), the sleeve 20 may slip into engagement with the abutment surface 15 once the lip 36 clears the abutment surface 15. While slipping into engagement, the sleeve 20 may move closer to the aforementioned relaxed (i.e., closed) position P1. In other instances, the sleeve 20 is moved between the relaxed (i.e., closed) position P1 and the expanded (i.e., open) position P2 with the lip 36 in alignment with the abutment surface 15. Any combination of moving the sleeve 20 between the relaxed (i.e., closed) position P1 and the expanded (i.e., open) position P2 and movement (i.e., translation) along the furniture item 12 may position the lip 36 of the sleeve in abutment with the abutment surface 15. Once closed and surrounding the furniture item 12, the support member 24 is coupled to the sleeve 20. In the illustrated embodiment, when coupled to the sleeve 20 with the lip 36 in abutment with the abutment surface 15, the inner surface 50 of the support member 24 abuts the abutment surface 15 and is supported by the abutment surface 15. Accordingly, at least a portion of the weight of the accessory or accessories supported by the support member 24 can be transmitted through the inner surface 50 to the abutment surface 15 without having to be transmitted to the sleeve 20.

FIG. 13 illustrates an exemplary furniture item 12 configured for use with the accessory mounting system 10. The exemplary furniture item 12 is a standing workstation 12 having the aforementioned outer post 14 and inner post 16. The standing workstation 12 further includes a tabletop 66 coupled to the inner post 16, a screen 70 coupled to the tabletop 66, and a plurality of wheels 74 coupled to the outer post 14. The wheels 74 permit movement of the furniture item 12 along a support surface S. In some embodiments, the wheels 74 may include actuatable brakes configured to selectively inhibit movement of the furniture item 12 along the support surface S. Alternatively, the wheels 74 may be replaced by glides which support the standing workstation 12 on the support surface S. In some embodiments, the glides may be adjustable glides capable of ensuring that the outer post 14 remains perpendicular to the support surface S and to inhibit tilting of the tabletop 66 relative to the support surface S. In still other embodiments, the wheels 74 may also be adjustable to inhibit tilting of the tabletop 66. In the exemplary furniture item 12, the inner post 16 is telescopically adjustable relative to the outer post 14 between an expanded position (FIG. 13) and a collapsed position (not shown). The accessory mounting system 10 is configured to rest upon the abutment surface 15 in both positions and intermediate positions between the expanded position and the collapsed position. The furniture item 12 may further include an actuator 78 to transition the furniture between the expanded position and the collapsed position. As noted above, the accessory mounting system may be positioned on (i.e., configured for use with) other types of furniture items other than the exemplary standing workstation 12.

Various features and advantages of the invention are set forth in the following claims.

What is claimed is:

1. An accessory mounting system configured to be supported by a furniture item, the accessory mounting system comprising:
   a sleeve including
      a body being at least partially elastically deformable and movable between a closed position and an open position, the body having
         a periphery partially surrounding a longitudinal axis and terminating at radial ends, and
         a pair of first features, each first feature being positioned adjacent one of the radial ends; and
   a support member including
      a support portion configured to support an object, and
      a sleeve engaging portion having a pair of second features configured to engage the pair of first features,
   wherein, in the closed position, a gap having a first size is formed between the pair of first features, and the pair of second features engages the pair of first features to hold the body in the closed position, and
   wherein, in the open position, the gap between the pair of first features has a second size that is larger than the first size.

2. The accessory mounting system of claim 1, wherein the pair of first features includes a pair of fingers, and wherein the pair of second features includes a pair of receptacles configured to receive the pair of fingers.

3. The accessory mounting system of claim 1, wherein the pair of first features and the pair of second features each extend parallel to the longitudinal axis.

4. The accessory mounting system of claim 3, wherein at least one of the pair of first features and at least one of the pair of second features is tapered.

5. The accessory mounting system of claim 4, wherein the periphery of the body has an upper axial end and a lower axial end, wherein the at least one of the pair of first features has a first dimension adjacent the upper axial end and a second dimension adjacent the lower axial end that is smaller than the first dimension.

6. The accessory mounting system of claim 1, wherein the support member is generally rigid.

7. The accessory mounting system of claim 1, wherein the support portion includes a hook configured to support the object.

8. The accessory mounting system of claim 1, wherein the pair of first features and the pair of second features have corresponding cross-sectional shapes taken perpendicular to the longitudinal axis.

9. The accessory mounting system of claim 1, wherein the body of the sleeve also includes a lip extending radially inwardly from the periphery towards the longitudinal axis, and wherein the lip is configured to engage an abutment surface on the furniture item.

10. The accessory mounting system of claim 1, wherein the body of the sleeve also includes a plurality of ribs extending radially inwardly from the periphery towards the longitudinal axis, and wherein the plurality of ribs is configured to engage the furniture item.

11. An accessory mounting system configured to be supported by a furniture item having an abutment surface, the accessory mounting system comprising:
   a sleeve including
      a body being at least partially elastically deformable and movable between a closed position and an open position, the body having
         a periphery partially surrounding a longitudinal axis, the periphery having an axial end and terminating at radial ends, and
         a lip extending radially inwardly from the periphery towards the longitudinal axis and configured to engage the abutment surface; and
   a support member including
      a support portion configured to support an object, and
      a sleeve engaging portion coupled to the sleeve.

12. The accessory mounting system of claim 11, wherein the lip is positioned adjacent the axial end of the periphery.

13. The accessory mounting system of claim 11, wherein the lip extends continuously between the radial ends of the periphery.

14. The accessory mounting system of claim 11, wherein in the open position, a gap is formed between the radial ends of the periphery such that the sleeve can be wrapped around the furniture item, and wherein in the closed position, the radial ends of the periphery are engaged by the sleeve engaging portion of the support member to secure the sleeve on the furniture item.

15. The accessory mounting system of claim 11, wherein the body of the sleeve also includes a plurality of ribs extending radially inwardly from the periphery towards the longitudinal axis, and wherein the plurality of ribs is configured to engage the furniture item.

16. The accessory mounting system of claim 11, wherein the support portion includes a hook configured to support the object.

17. A method of securing an accessory mounting system to a furniture item, the accessory mounting system including a sleeve having a body with a periphery terminating at radial ends and a pair of first features positioned adjacent the radial ends, the accessory mounting system also including a support member having a support portion configured to support an object and a sleeve engaging portion having a pair of second features, the method comprising:

positioning the sleeve around a portion of the furniture item;

moving the pair of first features toward each other while the sleeve is positioned around the furniture item; and sliding the support member onto the sleeve while the pair of first features are moved together such that the pair of second features engages the pair of first features to secure the accessory mounting system to the furniture item.

18. The method of claim 17, wherein the furniture item includes an abutment surface and the body of the sleeve also has a lip extending radially inwardly from the periphery, and wherein positioning the sleeve includes engaging the abutment surface with the lip.

19. The method of claim 17, wherein the periphery of the sleeve and the furniture item define a longitudinal axis, and wherein sliding the support member onto the sleeve includes sliding the support member in a direction parallel to the longitudinal axis.

20. The method of claim 17, wherein positioning the sleeve includes moving the pair of first features away from each other such that a gap is formed between the pair of first features and the sleeve can be wrapped around the portion of the furniture item.

\* \* \* \* \*